US007885262B2

(12) United States Patent
Chen et al.

(10) Patent No.: US 7,885,262 B2
(45) Date of Patent: Feb. 8, 2011

(54) METHOD AND AN APPARATUS FOR RESOURCE ADMISSION CONTROL PROCESS

(75) Inventors: Yuepeng Chen, Shenzhen (CN);
Lingyuan Fan, Shenzhen (CN); Fuqing Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 924 days.

(21) Appl. No.: 11/515,564

(22) Filed: Sep. 5, 2006

(65) Prior Publication Data

US 2007/0053361 A1    Mar. 8, 2007

(30) Foreign Application Priority Data

Sep. 2, 2005    (CN)    ......................... 2005 1 0098542

(51) Int. Cl.
*H04L 12/28* (2006.01)
*H04L 12/56* (2006.01)

(52) U.S. Cl. .................... 370/392; 370/216; 370/248

(58) Field of Classification Search .................. 370/392
See application file for complete search history.

(56) References Cited

U.S. PATENT DOCUMENTS

| 5,960,002    A  *  | 9/1999  | Ramfelt et al. .............. 370/450 |
| 2007/0053361 A1 * | 3/2007  | Chen et al. .................. 370/392 |

FOREIGN PATENT DOCUMENTS

| CN | 1610330 A    | 4/2005 |
| WO | 2004061543 A2 | 7/2004 |

OTHER PUBLICATIONS

Draft ETSI TS 2XX XXX v<0.0.3> (Mar. 2005) Telecommunication and Internet Converged Services and Protocols for Advanced Networking (TISPAN); IP Multimedia Subsystem (IMS); Stage 2 TISPAN NGN Release 1 TS.23.228 Release 6 modified.*
Draft ETSI ES 2XX XXX v<1.5.0> (May 2005) NGN Functional Architecture; Resource and Admission Control Subsystem (RACS); Release 1.*

(Continued)

*Primary Examiner*—Daniel Wu
*Assistant Examiner*—Frederick Ott

(57) ABSTRACT

A method for resource admission control process, an Access-Resource and Admission Control Function entity and a Service-based Policy Decision Function entity, wherein the method includes: sending an Admission Request message, which carries the current media stream address information, to an Access-Resource and Admission Control Function entity (A-RACF) in an originating home network from a Service-based Policy Decision Function entity (SPDF) when the SPDF successfully configures an IP Multimedia Subsystem (IMS) connection for a Core Border Gateway Function entity (C-BGF) in the originating home network; and performing a resource admission control process for a corresponding media stream by the A-RACF according to the received Admission Request message. With the method of the present invention, the resource admission control process performed by the A-RACF on the media stream may become meaningful.

19 Claims, 8 Drawing Sheets

OTHER PUBLICATIONS

"Draft ETSI TS 2XX XXX V<0.0.0> (Jan. 2005) Telecommunications and Internet converged Services and Protocols for Advanced Networking (TISPAN); Policy Control over Gq interface TISPAN NGN Release 1," European Telecommunications Standards Institute, Jan. 2005.

"Draft ETSI TS 2XX XXX V<0.0.3> (Mar. 2005) Telecommunications and Internet converged Services and Protocols for Advanced Networking (TISPAN); IP Mutimedia Subsystem (IMS); Stage 2 TISPAN NGN Release 1," European Telecommunications Standards Institute, Mar. 2005.

"Draft ETSI TS 2XX XXX V<1.5.0> (May 2005) NGN Functional Architecture; Resource and Admission Control Subsystem (RACS); Release 1," European Telecommunications Standards Institute, May 2005.

"ETSI ES 282 001 V1.1.1 (Aug. 2005) Telecommunications and Internet converged Services and Protocols for Advanced Networking (TISPAN); NGN Functional Architecture Release 1," European Telecommunications Standards Institute, Aug. 2005.

"ETSI ES 282 003 V1.1.1 (Jun. 2006) Telecommunications and Internet converged Services and Protocols for Advanced Networking (TISPAN); Resource and Admission Control Sub-system (RACS); Functional Architecture," European Telecommunications Standards Institute, Jun. 2006.

Xu Heyuan, "Next Generation Networking (NGN) Architecture," Telecommunications Engineering Technology and Standardization, 2005.3 (English Abstract provided).

Foreign Communication From a Related Counterpart Application—Office Action from European Patent Office, EP application No. 06018260.7, Oct. 9, 2007, 5 pages.

Foreign Communication From a Related Counterpart Application—Office Action from Japanese Patent Office, EP application No. 2006-237314, Oct. 7, 2009, 28 pages.

Issued Related Counterpart Application—Issued Chinese Patent, CN patent No. 100459518, Feb. 4, 2009, 27 pages.

ETSI Standard, Draft ETSI TS 2XX XXX V<0.0.5>, Telecommunications and Internet Converged Services and Protocols for Advanced Networking (TISPAN); IP Multimedia Subsystem (IMS);Stage 2 TISPAN NGN Release 1, Mar. 2005, total 50 pages.

\* cited by examiner

METHOD AND AN APPARATUS FOR RESOURCE ADMISSION CONTROL PROCESS

FIELD OF THE INVENTION

The present invention relates to the field of the Next Generation Network (NGN), and particularly to a method and functional entity for resource admission control process.

BACKGROUND OF THE INVENTION

Since the birth of the Internet technology, the networks generally distribute data in the "best effort" mode without a guarantee of Quality of Service (QoS).

In the early 1990's, the Internet Engineering Task Force (IETF) proposed a model of Integrated Services (IntServ) to meet the requirement of the real time services such as Voice over IP (VoIP). Such a model for communication services is a stream-based mechanism with a guarantee of QoS, has a strict control over network resources and provides the guarantee of QoS for the application layer. However, this model suffers from the problem of extensibility, since each of the routers, through which a service stream passes, has to maintain a soft status for the model. Therefore, the IntServ model fails to be widely used.

The IETF further proposed a model of Differentiated Services (DiffServ) in 1998. The DiffServ model is a class-based mechanism with a guarantee of QoS, and is successful in the network deployment. However, this model provides only a relative guarantee of QoS, and fails to provide guarantee of QoS, especially in the case of an insufficient bandwidth.

The IETF further proposed a model of DS-Aware MPLS TE in 2002. The model incorporates the advantages of both the DiffServ model and the model of Multiprotocol Label Switching Traffic Engineering (MPLS-TE), optimizes the transmission resources and further improves the performance and the efficiency of the networks. However, this model suffers from a problem of square-of-N and has a difficulty in the inter-domain communication.

Based upon the prior art, neither a large bandwidth nor the DiffServ model can solve the problem of end-to-end QoS in reality. In recent years, the Dynamic QoS (DQoS), i.e. the dynamic session-based QoS-control mechanism, has gradually become a main research direction. This mechanism enables a Connection Admission Control (CAC) based on each session, a resource reservation and a dynamic policy distribution in the control plane, and implements the functions of service aware and strategy execution in the data plane. Such a mechanism can provide both a strict guarantee of QoS and a good extensibility. As a result, many standard organizations are addressing themselves to the similar mechanisms, in which the study of the organization of TISPAN (Telecommunications and Internet Converged Services and Protocols for Advanced Networking) wins the recognition of the industry.

Refer to FIG. 1, which is a schematic diagram of the basic network framework of the NGN established by the TISPAN, in which the NGN framework mainly includes a Service Layer 110 and an Internet Protocol-based (IP-based) Transport Layer 120.

Particularly, the service layer includes a Core IP Multimedia Subsystem 111, a PSTN/ISDN Emulation Subsystem (PES) 112, other Subsystems 113 (such as a streaming media subsystem, a content broadcast subsystem or the like) and an Application 114. In addition, some common components, such as a billing function, a user data management, a security management, a route database and the like, are also included.

The transport layer 120 is adapted to provide an IP interconnection for a User Equipment (UE) 130 with the introduction of two control subsystems, that is, a Network Attachment Subsystem (NASS) 121 and a Resource and Admission Control Subsystem (RACS) (122), both of which are adapted to hide the transport technologies below the IP layers of the access network and the core network.

Here, the Core IMS Subsystem 111 of the service layer mainly includes a Call Session Control Function entity (CSCF) which further includes a Proxy Call Session Control Function entity (P-CSCF), a Serving Call Session Control Function entity (S-CSCF) and an Interrogating Call Session Control Function entity (I-CSCF). Wherein the P-CSCF is the first contact point of the user equipment 130 within the Core IMS Subsystem; the S-CSCF is responsible for processing the network session status; and the I-CSCF is a contact point within an operator network for all subscribers with an access to the operator network or roamer within the service region of the operator network.

Now refer to FIG. 2 as well, which is a schematic diagram of the basic architecture of a RACS under the NGN R1 network architecture which is being established by the TISPAN, wherein both the QoS of the bearer network and the Network Address and Port Translator (NA(P)T) shall access the RACS and be controlled by the RACS.

The RACS mainly includes an Application Function entity (AF) 1, a Service-based Policy Decision Function entity (SPDF) 2, and a Core Border Gateway Function entity (C-BGF) 3, an Access-Resource and Admission Control Function entity (A-RACF) 4 and a Resource Control Enforcement Function entity (RCEF) 5. The relationship and interfaces between the RACS and related functions may refer to FIG. 2, wherein the control function of the NA(P)T may be achieved mainly through a signaling interaction between the AF 1, the SPDF 2 and the C-BGF 3. Other entities, such as the A-RACF 4 and the RCEF 5, may be applied mainly for the control over the QoS resources of the access layer.

The RACS provides an admission control function and a gateway control function (including a NA(P)T control and a DSCP flag). Here, the admission control function includes a check of subscription data saved at the network attachment subsystem based upon the specific policy rules and resources of the operator, an authorization, a check of the resource availability, and a verification of the consistency of a requested bandwidth with a predefined bandwidth and a user-used bandwidth and the like.

At present, in the above described NGN architecture established by the TISPAN, a Fixed Origination (FO) flow for an IMS session establishment is shown in FIG. 3. Here, the Fixed Origination flow for an IMS session establishment mainly applies to a user within its home network, and the UE of the user is located in the home network, but has an access to the IMS core network through xDSL (Digital Subscriber Line). The detailed implementation process is as following:

301: An originating UE sends a Session Initiation Protocol (SIP) Invite request, which contains a Session Description Protocol (SDP) Offer, to the P-CSCF, wherein the SDP offer contained in the SIP Invite request sent from the originating UE may be indicative of one or more media of a multimedia session;

302~306: The SPDF reserves an IMS connection for the C-BGF, and may optionally request the C-BGF to perform a NA(P)T binding process;

307: The P-CSCF forwards the SIP Invite request, which carries the SDP offer and is sent from the originating UE, to a corresponding S-CSCF according to a next-hop CSCF of the originating UE recorded in the registration flow;

308: The S-CSCF determines a Service Profile upon receipt of the SIP Invite request with the SDP offer, and also invokes any initiation service logic required by the originating UE, including the procedure of performing a requested SDP authorization based upon a user multimedia Service Subscription;

309: The S-CSCF forwards the SIP Invite request with the SDP offer to a terminating UE;

310: An Offer Response returned from the terminating UE may be returned to the S-CSCF along the original signaling path;

311: The S-CSCF forwards the received Offer Response message to the P-CSCF;

312~315: The P-CSCF triggers the SPDF to request the A-RACF to perform an admission control process based upon the parameters of the received offer and the offer response;

316~319: The SPDF further performs a process of configuring an IMS connection for the C-BGF upon the success of the resource admission, and may optionally request the C-BGF to perform a NA(P)T binding process;

320: The P-CSCF feeds back the received Offer Response message to the originating UE.

As can be seen from the above described fixed origination flow, during the process of establishing an IMS session connection by the originating UE, the procedure of the resource admission control, performed by the A-RACF based upon the parameters of the offer and offer response carried in the admission request message sent from the SPDF, is performed prior to the IMS connection configuration processing executed by the SPDF for the C-BGF, such a procedure may result in the following problems:

If the SPDF requests the C-BGF to perform a NA(P)T binding process while performing the process of configuring the IMS connection for the C-BGF, the media stream address information after this NA(P)T binding process can be valid only for the A-RACF. Thus it would be meaningless to perform a resource admission control ahead of time before the A-RACF obtains the valid media stream address information.

In the above described NGN architecture established by the TISPAN, a Fixed Termination flow for establishing an IMS session is as shown in FIG. 4. Here, the Fixed Termination flow for establishing an IMS session mainly applies to a user within a home network, and the UE of the user is located in the home network, but has a registration on the IMS core network through xDSL. The detailed implementation process is as follows:

401: The SIP invite request, which contains the SDP offer and is sent from the originating UE, is forwarded to the S-CSCF of the terminating UE;

402: The S-CSCF determines a Service Profile upon receipt of the SIP Invite request with the SDP offer, and also invokes any initiation service logic required by the terminating party, including the procedure of performing a requested SDP authorization based upon a user multimedia Service Subscription;

403: The S-CSCF forwards the received SIP Invite request with the SDP offer to the P-CSCF in the terminating home network;

404~407: The P-CSCF triggers the SPDF in the terminating home network to request that the A-RACF performs an admission control based upon the parameters of the received offer and the offer response.

408~411: The SPDF reserves an IMS connection for the C-BGF upon the success of the resource admission, and may optionally request the C-BGF to perform a NA(P)T binding process;

412: The S-CSCF forwards the SIP Invite request with the SDP offer to the terminating UE according to the address information of the termination UE recorded during the registration flow;

413: The terminating UE sends an offer response message to the originating UE according to a subset of media streams, which is supported by the SDP offer and is sent from the originating UE, wherein the SDP offer may be indicative of one or more media of a multimedia session, and this offer response message would be sent to the P-CSCF;

414~418: The P-CSCF triggers the SPDF to perform a process of configuring an IMS connection for the C-BGF, and may optionally further request the C-BGF to perform a NA(P)T binding process;

419: The P-CSCF forwards the offer response message to the S-CSCF;

420: The S-CSCF forwards the offer response message to the originating UE.

As can be seen from the above fixed termination flow, during the process of establishing an IMS session connection by the terminating party, the SPDF has already sent an admission request message to the A-RACF before the terminating UE receives the SIP Invite request, so that the A-RACF correspondingly performs a resource admission control according to the parameters of the offer and the offer response carried in the admission request message sent from the SPDF.

As a result, the A-RACF in the terminating home network can not obtain the valid media stream address information before the terminating UE receives the SIP Invite request, and it may become meaningless to perform a resource admission control ahead of time before the A-RACF obtains the valid media stream address information.

SUMMARY OF THE INVENTION

The present invention provides a method and a function entity for resource admission control process.

The technical solution provided according to the present invention may be as follows:

A method for resource admission control process, wherein the method may include:

sending, by a Service-based Policy Decision Function entity (SPDF), an Admission Request message containing the current media stream address information, to an Access-Resource and Admission Control Function entity (A-RACF) locating in an originating home network when the SPDF successfully performs a process of configuring an IP Multimedia Subsystem (IMS) connection for a Core-Border Gateway Function entity (C-BGF) locating in the originating home network; and performing, by the A-RACF, a resource admission control process for a corresponding media stream according to the Admission Request message.

Optionally, the method may further include:

requesting, by the SPDF, the C-BGF to perform a network address and/or port number translation NA(P)T binding process for the media stream, while performing, by the SPDF, the process of configuring the IMS connection for the C-BGF.

Optionally in the Admission Request message which carries the current media stream address information, the current media stream address information may be:

the media stream address information, which is acquired after the NA(P)T binding process for the media stream and is fed back from the C-BGF to the SPDE Optionally before the SPDF performs the process of configuring an IMS connection for the C-BGF, the method may further include:

triggering the SPDF in the originating home network to perform the process of configuring the IMS connection for the C-BGF locating in the originating home network by a Proxy Call Session Control Function entity (P-CSCF) in the originating home network when the P-CSCF receives an Offer Response message from a terminating party.

Optionally in the Admission Request message which carries the current media stream address information, the current media stream address information may be the media stream address information assigned by the terminating party to the media stream.

Optionally, the media stream address information assigned by the terminating party to the media stream, may be carried in the Offer Response message fed back by the terminating party and received by the P-CSCF;

before sending, by the SPDF, the Admission Request message to the A-RACF, the method further comprises:

setting, by the P-CSCF, the media stream address information into an Authentication Authorization Request message, and sending the Authentication Authorization Request message to the SPDF;

determining, by the SPDF, the media stream address information as the current media stream address information.

A method for resource admission control process, wherein the method may include:

triggering a Service-based Policy Decision Function entity (SPDF) in a terminating home network by a Proxy Call Session Control Function entity (P-CSCF) in the terminating home network to send an Admission Request message containing the current media stream address information, to an Access-Resource and Admission Control Function entity (A-RACF) in the terminating home network, when the P-CSCF determines the current media stream address information; and performing, by the A-RACF, a resource admission control process for a corresponding media stream according to the received Admission Request message.

Optionally, the process of the P-CSCF determining the current media stream address information may further include:

feeding back, from the terminating party, a response message, which carries media stream address information assigned by the terminating party to a media stream, to the P-CSCF in the terminating home network; and determining, by the P-CSCF, the media stream address information, which is carried in the received response message, as the current media stream address information.

Optionally, the response message fed back to the P-CSCF from the terminating party may be:

an Offer Response message; or an acknowledgement 200 OK message.

Optionally, the process of triggering the SPDF to send an Admission Request message carrying the current media stream address information to the A-RACF may further include:

setting, by the P-CSCF, the determined current media stream address information into an Authentication Authorization Request message, and sending the Authentication Authorization Request message to the SPDF in the home network of terminating party;

setting, by the SPDF, the media stream address information into the Admission Request message and sending the Authentication Authorization Request message to the A-RACF.

Optionally, before performing a resource admission control process for a corresponding media stream by the A-RACF, the method may further include the step of:

triggering the SPDF in the terminating home network by the P-CSCF in the terminating home network to perform the process of configuring an IP Multimedia Subsystem (IMS) Connection for a Core Border Gateway Function entity (C-BGF) in the terminating home network.

Optionally, after performing a resource admission control process for a corresponding media stream by the A-RACF, the method may further include the step of:

triggering the SPDF in the terminating home network by the P-CSCF in the terminating home network to perform the process of configuring an IP Multimedia Subsystem (IMS) Connection for a Core Border Gateway Function entity (C-BGF) in the terminating home network.

Optionally, while performing a resource admission control process for a corresponding media stream by the A-RACF, the method may further include the step of:

triggering the SPDF in the terminating home network by the P-CSCF in the terminating home network to perform the process of configuring an IP Multimedia Subsystem (IMS) Connection for a Core Border Gateway Function entity (C-BGF) in the terminating home network.

The present invention also provides a Service-based Policy Decision Function entity (SPDF) including:

a Configure Connection message receiving unit, adapted to receive the Configure IP Multimedia Subsystem (IMS) Connection message from a Core Border Gateway Function entity (C-BGF);

a current media stream address information obtaining unit, adapted to obtain the current media stream address information, the current media stream address information is acquired after a network address and/or port number translation NA(P)T binding process and carried in the Configure IMS Connection message; and an Admission Request message constructing unit, adapted to set the current media stream address information into the Admission Request message.

The present invention also provides a Service-based Policy Decision Function entity including:

an Authentication Authorization Request message receiving unit, adapted to receive the Authentication Authorization Request message from a Proxy Call Session Control Function entity (P-CSCF);

a current media stream address information obtaining unit, adapted to obtain the media stream address information which is assigned by a terminating party to a media stream and is carried in the Authentication Authorization Request message; and an Admission Request message constructing unit, adapted to set the current media stream address information into the Admission Request message.

The present invention also provides a Proxy Call Session Control Function entity including:

a current media stream address information determining unit, adapted to determine the media stream address information, which is assigned by a terminating party to a media stream and is carried in a response message fed back from the terminating party, as the current media stream address information; and a resource admission control process triggering unit, adapted to trigger an Access-Resource and Admission Control Function entity (A-RACF) by a Service-based Policy Decision Function entity (SPDF) to perform a resource admission control process after the current media stream address information determining unit determines the current media stream address information.

It can be seen that during the OF processing flow according to an embodiment of the present invention, the A-RACF performs the resource admission process for a media stream after the SPDF performs the process of configuring an IMS connection for the C-BGF, so that when the SPDF requests the C-BGF to perform a NA(P)T binding process for the media stream while performing the process of configuring an IMS connection for the C-BGF, the SPDF can send the media stream address information, which is acquired after the NA(P)T binding process and is fed back from the C-BGF, to the A-RACF in time, and that the A-RACF can perform a resource admission control process for the corresponding media stream based upon the Admission Request message carrying an accurate media stream address information. Thus, the resource admission control process performed by the A-RACF may become really meaningful.

Accordingly, during the FT processing flow according to an embodiment of the present invention, the A-RACF will not be triggered to perform a resource admission control process for the corresponding media stream according to the Admission Request message carrying the determined media stream address information, until the P-CSCF has determines the accurate media stream address information. Thereby the resource admission control process performed by the A-RACF may become really meaningful.

BRIEF DESCRIPTIONS OF THE DRAWINGS

Figure 9:
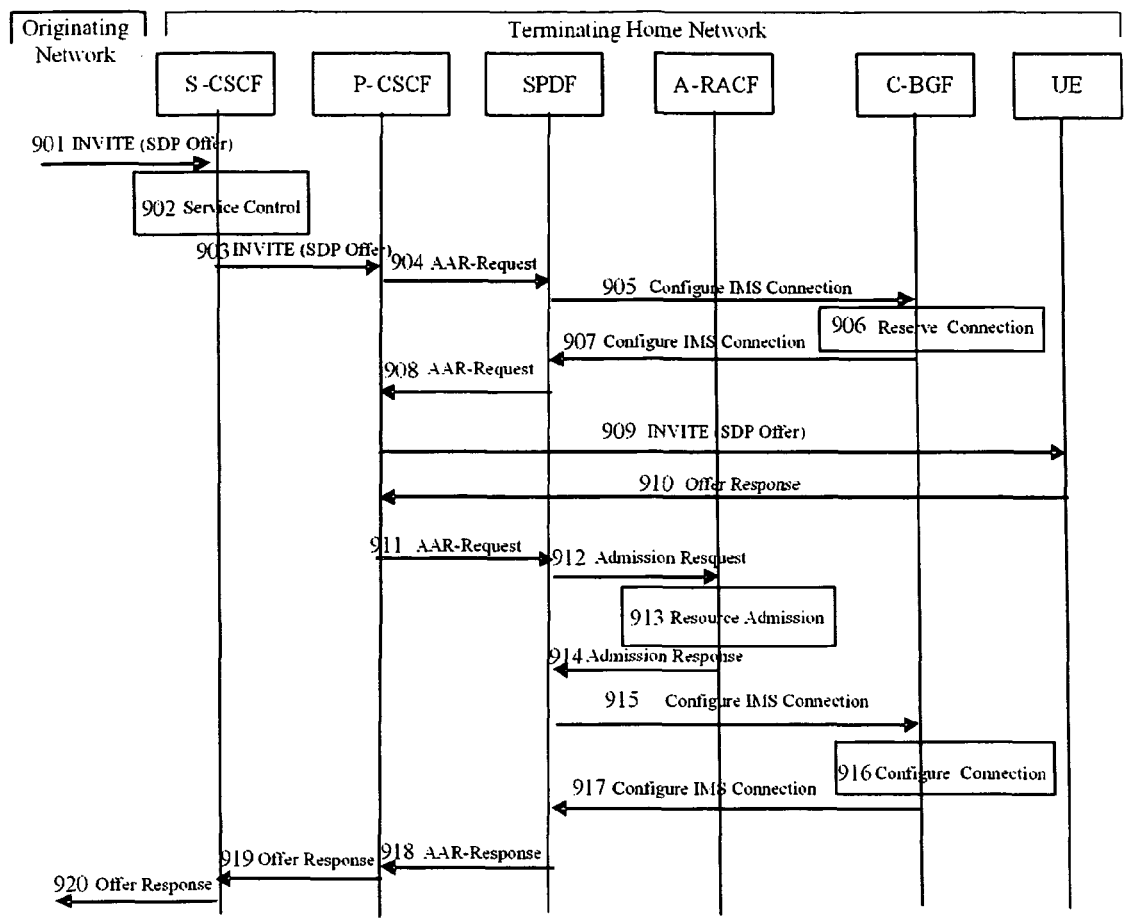
Figure 10:
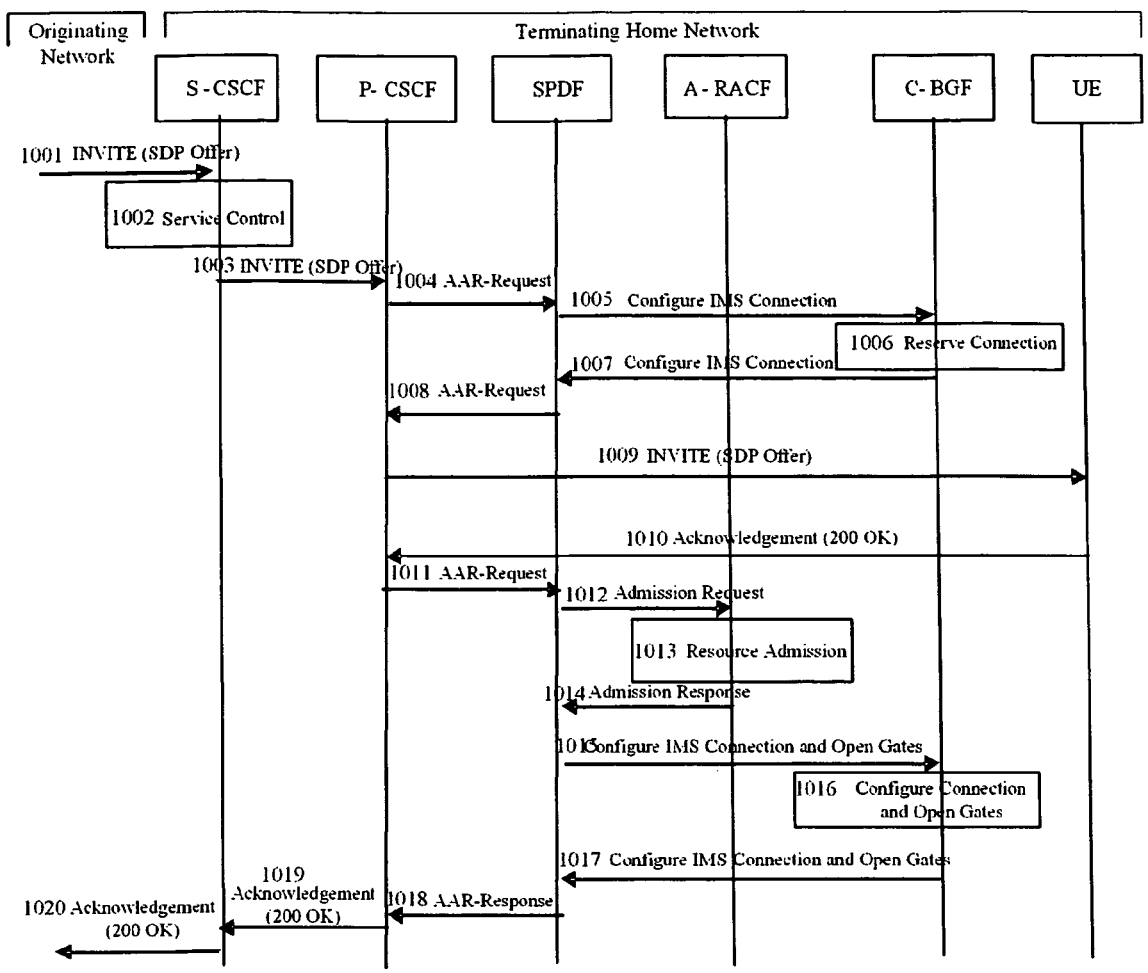

FIG. 9 is a schematic diagram of a processing procedure for implementing the resource admission control processing method applied in a FT processing flow as proposed according to a second embodiment of the present invention; and FIG. 10 is a schematic diagram of a processing procedure for implementing the resource admission control processing method applied in a FT processing flow as proposed according to a third embodiment of the present invention.

DETAILED DESCRIPTIONS OF THE EMBODIMENTS

The main idea according to the present invention lies in that, an A-RACF will not be triggered to perform a resource admission control for a corresponding media stream according to the media stream information containing the media stream address information that is really valid at present, until it is determined that media stream address information which is really valid at present has been obtained, so that the resource admission control performed by the A-RACF may become meaningful actually.

The main implementation principle and preferred embodiments according to the present invention will be further detailed in connection with the drawings.

Figure 1:
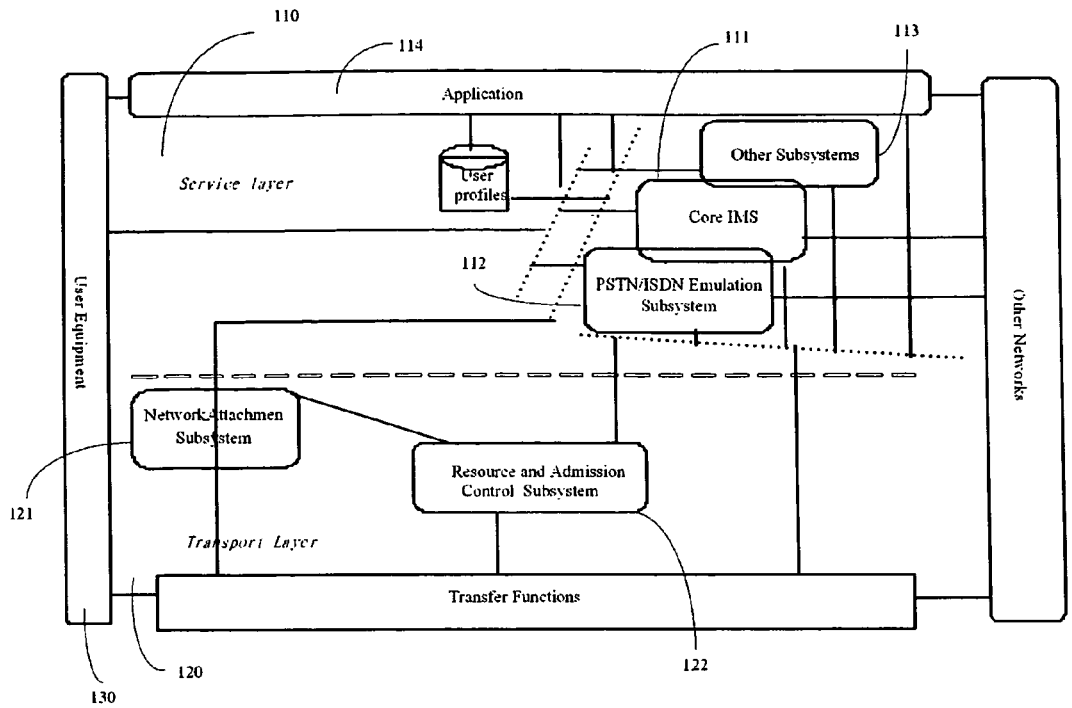
FIG. 1 is a schematic diagram of the basic network framework of the NGN established by the TISPAN in the prior art.
Figure 2:
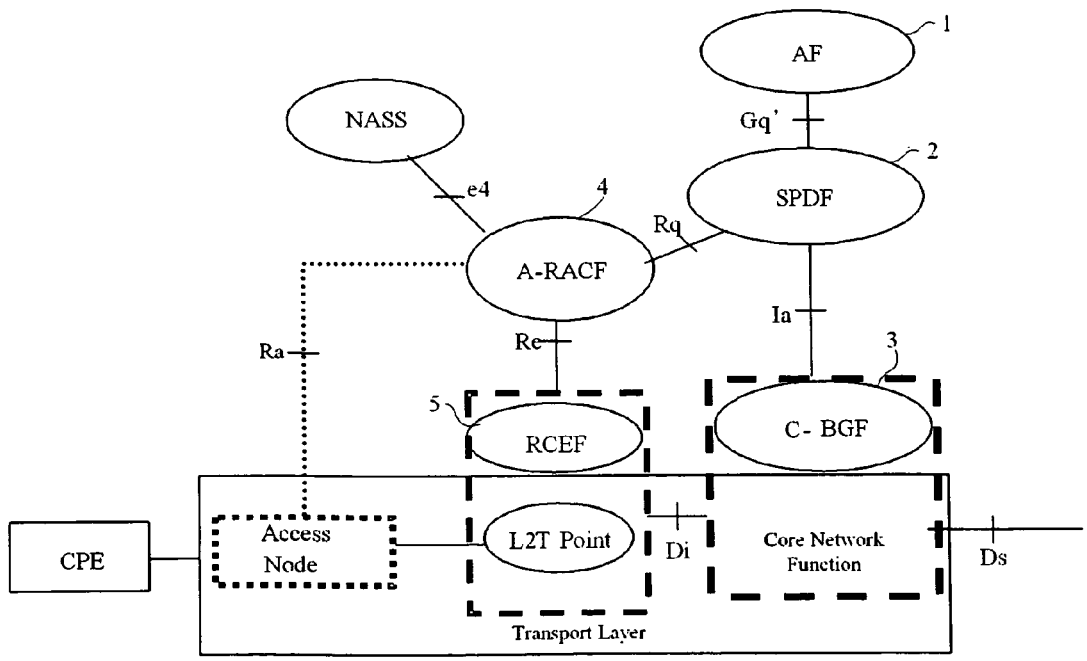
FIG. 2 is a schematic diagram of the basic architecture of a RACS in a NGN R1 network architecture being established by the TISPAN in the prior art.
Figure 3:
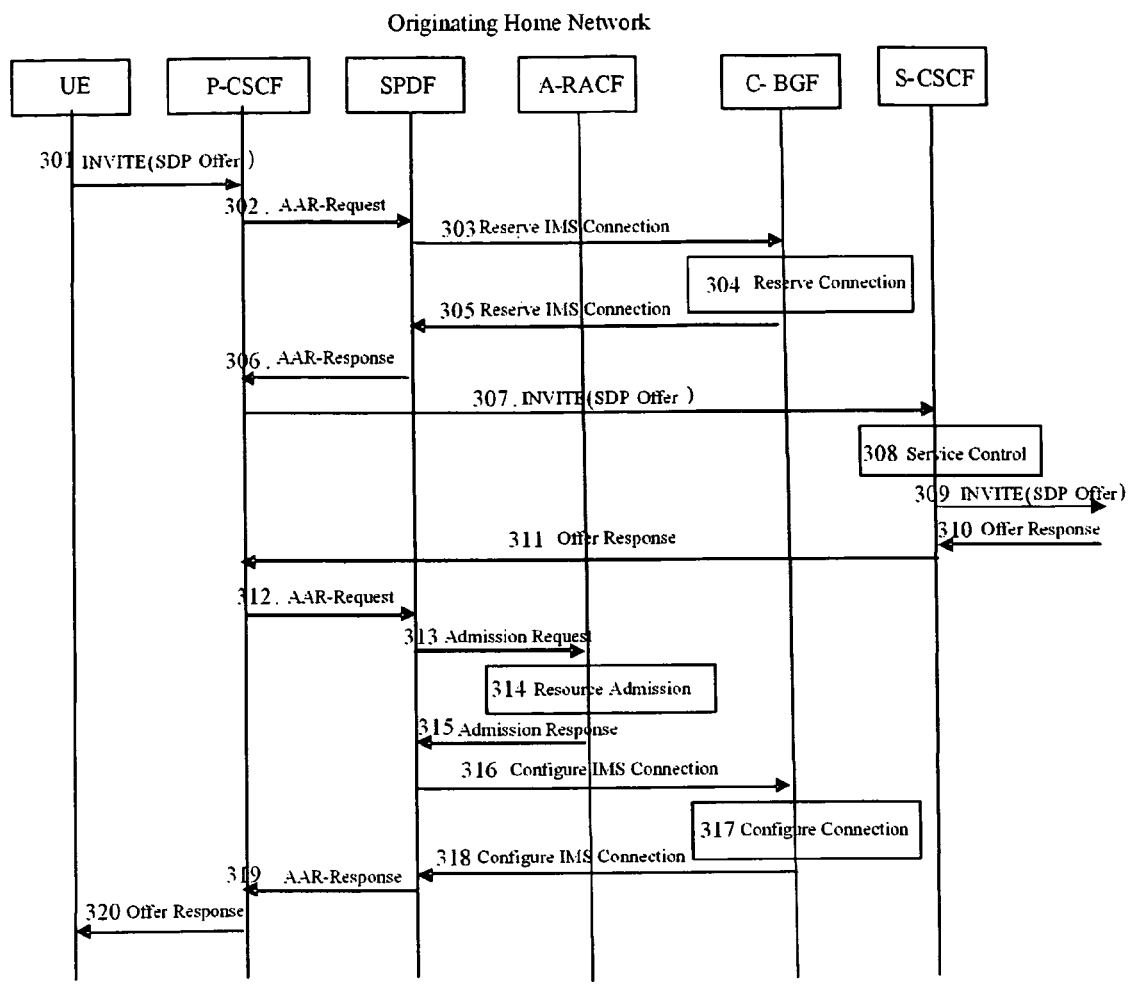
FIG. 3 is a schematic diagram of the processing procedure of a fixed origination flow for establishing an IMS session in the prior art.
Figure 4:
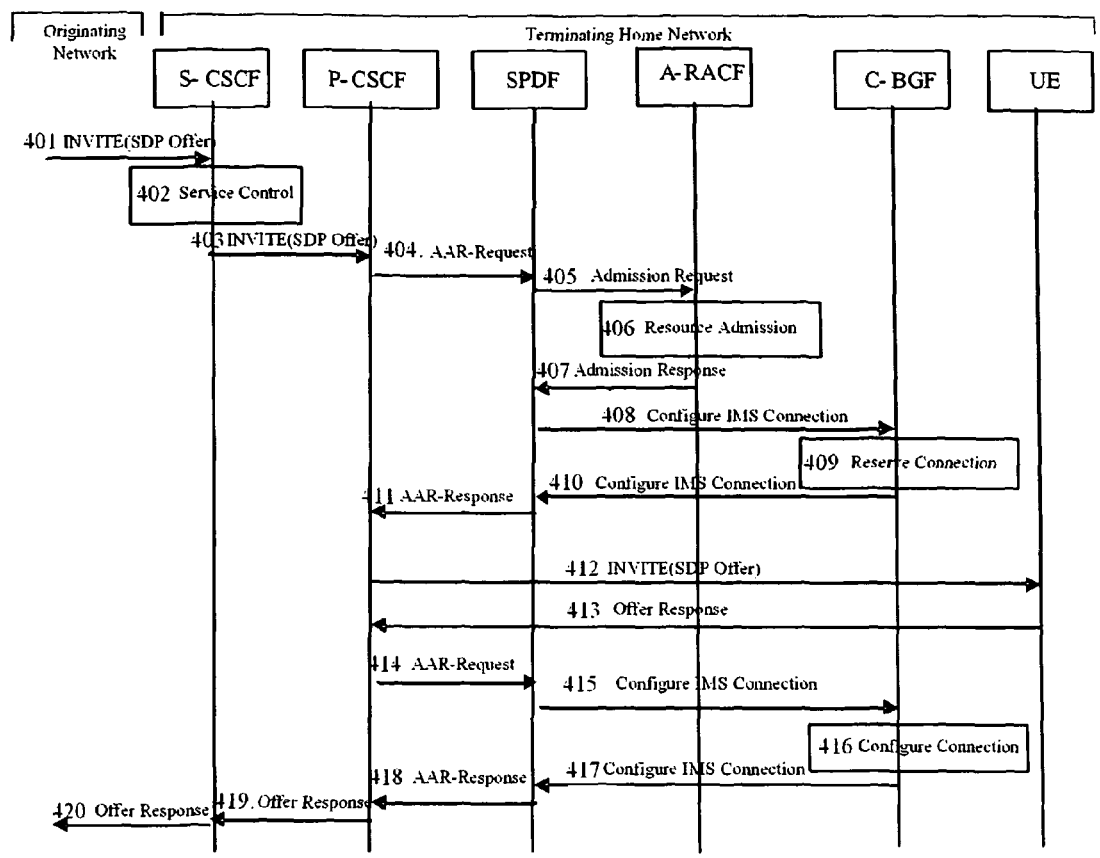
FIG. 4 is a schematic diagram of the processing procedure of a fixed termination flow for establishing an IMS session in the prior art.
Figure 5:
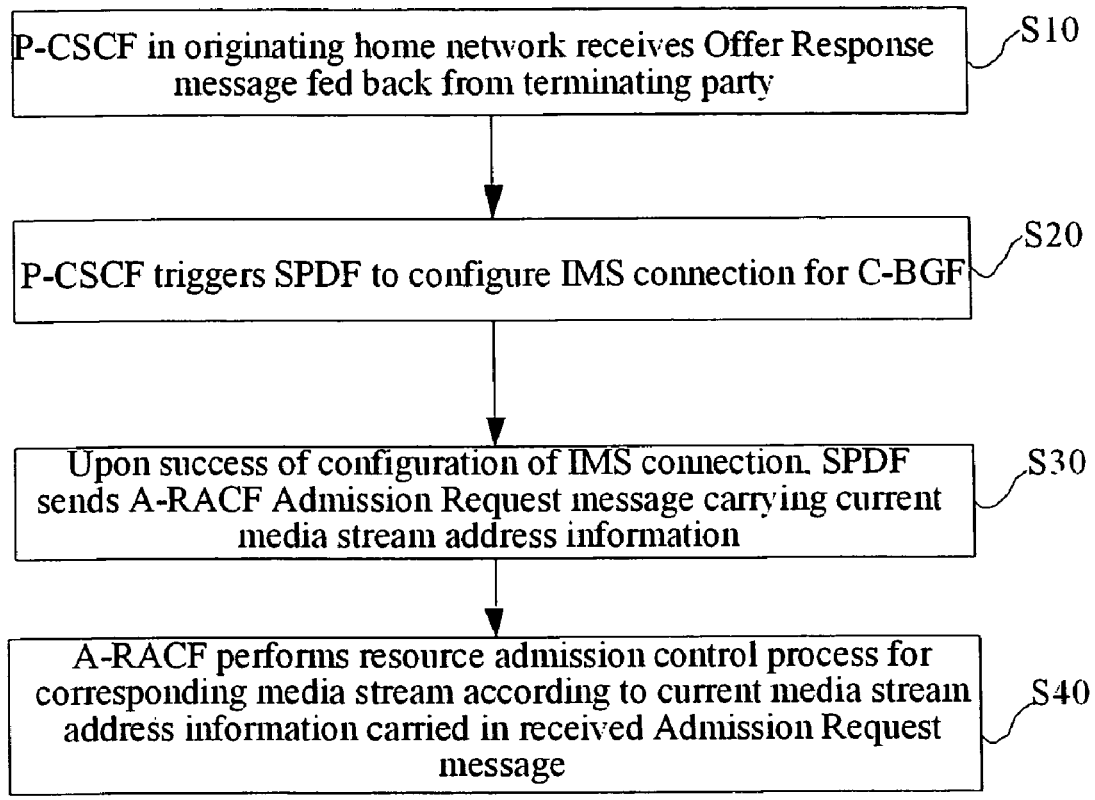
FIG. 5 is a flow chart of the main implementation principle of a resource admission control method applied in a FO processing flow as proposed according to an embodiment of the present invention.

Now refer to FIG. 5, which is a flow chart of the main implementation principle of a resource admission control method applied in an FO processing flow as proposed according to an embodiment of the present invention. The main implementation process thereof will be described as the follows.

In step S10, a P-CSCF in an originating home network receives an Offer Response message fed back from a terminating party.

In step S20, the P-CSCF triggers an SPDF in the originating home network to perform a process of configuring an IMS connection for a C-BGF in the originating home network.

In step S30, upon success of the configuration process of an IMS connection, the SPDF sends an Admission-Request message, which carries the current media stream address information, to an A-RACF in the originating home network.

In step S40, the A-RACF performs a resource admission control for the corresponding media stream according to the received Admission-Request message which carries the current media stream address information.

Particularly in step S20, during the configuration process of an IMS connection for the C-BGF, the SPDF may further request the C-BGF to perform a network address and/or port number translation binding process for the media stream, wherein:

1) In the case that the SPDF requests the C-BGF to perform a NA(P)T binding process for the media stream during the configuration process of an IMS connection for the C-BGF, the current media stream address information carried in the Admission-Request message sent from the SPDF to the A-RACF in step S30 may be:

the media stream address information which is acquired after the NA(P)T binding process and fed back to the SPDF, after the C-BGF performs the NA(P)T binding for the media stream.

2) In the case that the SPDF does not request the C-BGF to perform a NA(P)T binding process for the media stream during the configuration process of an IMS connection for the C-BGF, the current media stream address information carried in the Admission-Request message sent from the SPDF to the A-RACF in step S30 may be determined by the following.

a. The Offer Response message fed back from the terminating party to the P-CSCF carries the media stream address information assigned to the media stream by the terminating party;

b. The P-CSCF sets the media stream address information, which is carried in the received Offer Response message, into an Authentication Authorization Request (AAR-Request)

message, and transmits the Authentication Authorization Request (AAR-Request) message to the SPDF;

c. The SPDF takes the media stream address information, which is carried in the received AAR-Request message, as the current media stream address information that is to be carried in the Admission-Request message.

Figure 6:
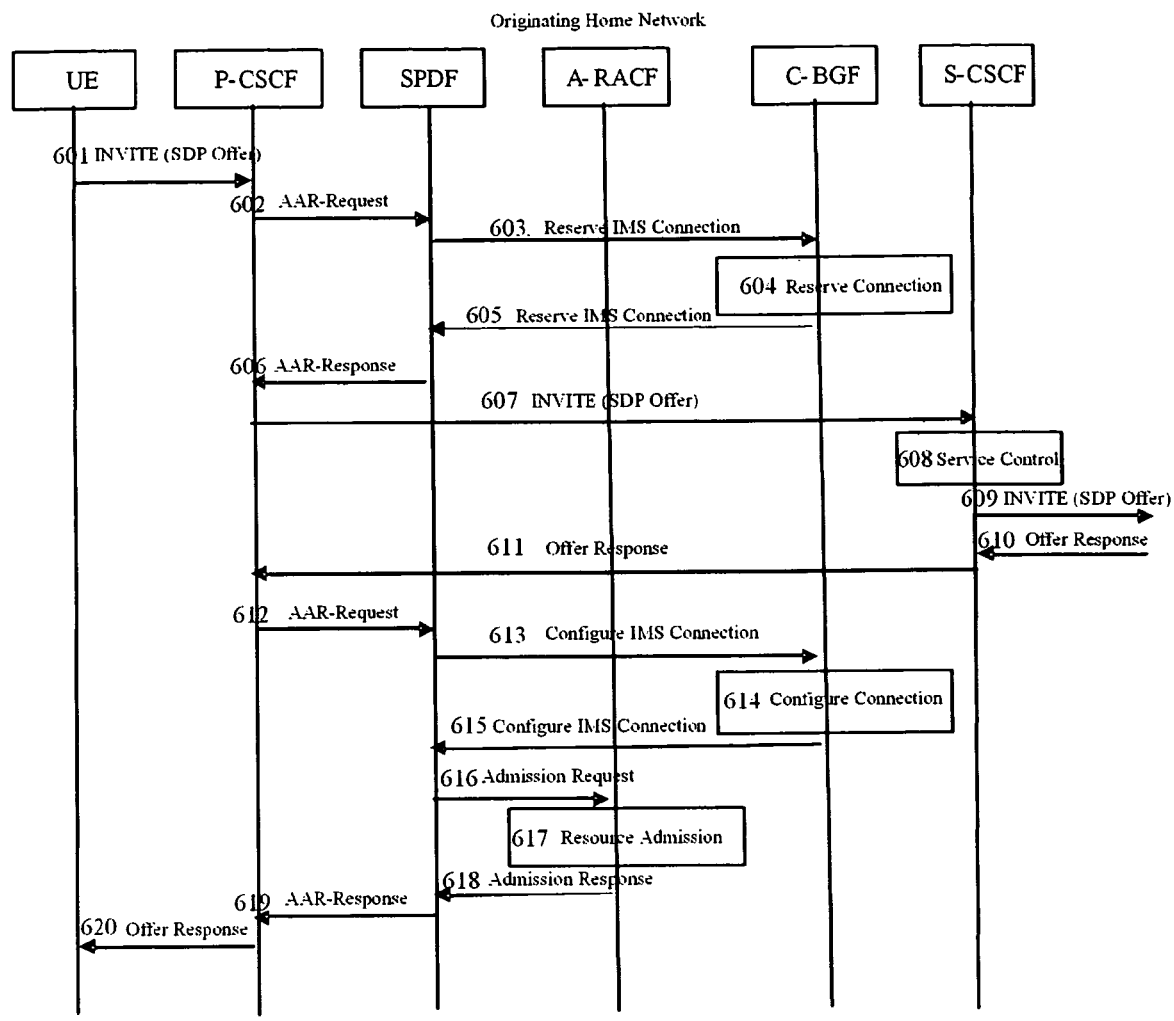
FIG. 6 is a schematic diagram of a processing procedure according to the first embodiment for implementing the resource admission control method applied in a FO processing flow as proposed according to the present invention.

Now refer to FIG. 6, which is a schematic diagram of a processing procedure for implementing the resource admission control method applied in an FO processing flow as proposed according to a first embodiment of the present invention. The main implementation process thereof will be described.

601: The originating UE sends a SIP Invite request with an SDP Offer to the P-CSCF in the originating home network, wherein the SDP Offer carried in the SIP Invite request sent from the originating UE may be indicative of one or more media in a multimedia session;

602~606: Upon receiving the SIP Invite request sent from the originating UE, the P-CSCF triggers the SPDF in the originating home network to reserve an IMS connection for the C-BGF, and optionally the SPDF may further request the C-BGF to perform a NA(P)T binding process;

607: The P-CSCF forwards the SIP Invite request with the SDP offer sent from the originating UE to a corresponding S-CSCF according to a next-hop CSCF of the originating UE recorded during the registration flow;

608: The S-CSCF determines a Service Profile upon receiving the SIP Invite request with the SDP offer, and invokes any initiation service logic required by the originating party, including the procedure of performing a requested SDP authorization based upon a user multimedia Service Subscription;

609: The S-CSCF forwards the SIP Invite request with the SDP offer to the terminating UE;

610: The Offer Response returned from the terminating UE may be returned to the S-CSCF in the originating home network along the original signaling path, where the fed-back Offer Response message carries the valid media stream address information assigned by the terminating UE to the media stream;

611: The S-CSCF forwards to the P-CSCF the received Offer Response message carrying the valid media stream address information obtained by the S-CSCF;

612: Upon receiving the Offer Response message, the P-CSCF sends to the SPDF an Authentication Authorization Request (AAR-Request) message, which carries the valid stream address information obtained by the P-CSCF;

613~615: Upon receiving the AAR-Request message, the SPDF performs a process of configuring an IMS connection for the C-BGF, and may optionally further request the C-BGF to perform a NA(P)T binding process;

616: In the case that the SPDF does not request the C-BGF to perform a NA(P)T binding process during the above procedure, the SPDF sends an Admission-Request message to the A-RACF upon the success of the configuration process of an IMS connection, and the Admission-Request message carries the valid media stream address information obtained by the SPDF in step 612;

In the case that the SPDF requests the C-BGF to perform a NA(P)T binding process during the above procedure, and the C-BGF performs the NA(P)T binding process accordingly, then in step 615, the media stream address information after the NA(P)T binding process can be carried in a Configure IMS Connection message to be fed back to the SPDF. Upon the success of the configuration process of an IMS connection and when the valid media stream address processed by the NA(P)T binding process is obtained, the SPDF further sends to the A-RACF the Admission-Request message which carries the media stream address information obtained by the SPDF;

617: The A-RACF performs a resource admission control for a corresponding media stream according to the media stream information carried in the received Admission-Request message, the media stream information contains the media stream address information;

618: The A-RACF feeds back an Admission-Response message to the SPDF upon the success of the resource admission control for the media stream;

619: The SPDF feeds back an Authentication Authorization Answer (AAR-Answer) message to the P-CSCF upon receiving the Admission-Response message fed back from the A-RACF;

620: The P-CSCF feeds back the Offer Response message received in the above step 611 to the originating UE upon receiving the AAR-Answer message fed back from the SPDF.

Figure 7:
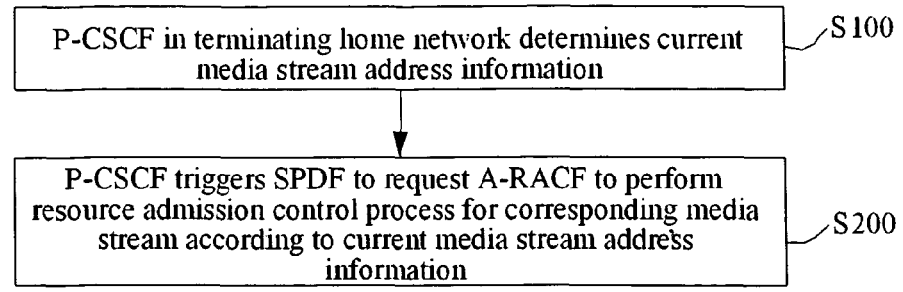
FIG. 7 is a flow chart of the main implementation principle of a resource admission control method applied in a FT processing flow as proposed according to an embodiment of the present invention.

Now refer to FIG. 7, which is a flow chart of main implementation principle of a resource admission control method applied in an FT processing flow as proposed according to an embodiment of the present invention. The main implementation process thereof will be described as following.

In step S100, a P-CSCF in an originating home network determines the current media stream address information.

Particularly, the P-CSCF in the originating home network determines the current media stream address information by the following:

A. The terminating party feeds back a response message, which carries the media stream address information assigned by the terminating party to a media stream, to the P-CSCF in the originating home network. The response message fed back by the originating party to the P-CSCF in the originating home network may be an Offer Response message or an acknowledgement (200 OK) message.

B. The P-CSCF determines whether the media stream address information carried in the received response message is the current media stream address information.

In step S200, the P-CSCF triggers an SPDF to request an A-RACF to perform a resource admission control for the corresponding media stream according to the media stream information containing the current media stream address information.

The P-CSCF sets the determined current media stream address information into an Authentication Authorization Request (AAR-Request) message, and transmits the AAR-Request message to the SPDF in the originating home network.

The SPDF sets the media stream address information, which is carried in the AAR-Request message, into an Admission-Response message, and transmits the Admission-Response message to the A-RACF in the terminating home network.

The A-RACF performs the resource admission control for the corresponding media stream according to the received Admission-Response message carrying the determined current media stream address information.

Particularly in step S200, the following procedure may be performed before the A-RACF performs the resource admission control for the media stream:

The P-CSCF in the terminating home network triggers the SPDF in the terminating home network to perform a process of configuring an IMS connection for the C-BGF in the terminating home network.

Alternatively in the step S200, the following procedure may be performed after the A-RACF performs the resource admission control for the media stream:

The P-CSCF in the terminating home network is set to trigger the SPDF to perform the process of configuring an IMS connection for the C-BGF.

Naturally, the procedure of triggering the SPDF to perform the configuration process of an IMS connection for the C-BGF by the P-CSCF in the terminating home network may be performed while performing the resource admission control for the media stream by the A-RACF in the step S200.

Figure 8:
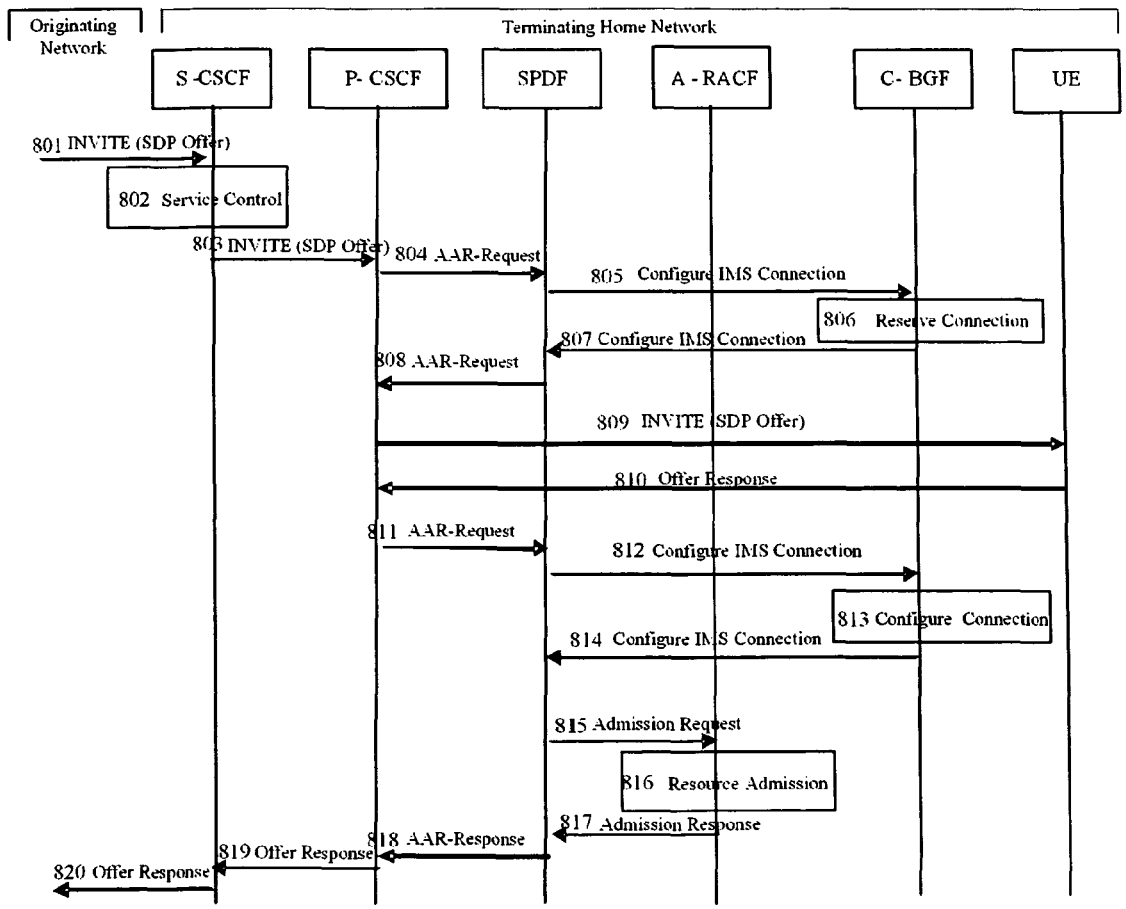
FIG. 8 is a schematic diagram of a processing procedure for implementing the resource admission control method applied in a FT processing flow as proposed according to a first embodiment of the present invention.

Now refer to FIG. 8, which is a schematic diagram of a processing procedure for implementing the resource admission control method applied in an FT processing flow as proposed according to a first embodiment of the present invention. The main implementation process thereof will be described as following.

801: The SIP Invite request with the SDP Offer sent by the originating UE is forwarded to the S-CSCF of the terminating party;

802: The S-CSCF determines a Service Profile upon receiving the SIP Invite request with the SDP offer, and also invokes any initiation service logic required by the terminating party, including the procedure of performing a requested SDP authorization based upon a user multimedia Service Subscription;

803: The S-CSCF forwards the received SIP Invite request with the SDP offer to the P-CSCF in the home network of the terminating UE;

804~808: Upon receipt of the SIP Invite request with the SDP Offer, the P-CSCF triggers the SPDF in the terminating home network to reserve an IMS connection for the C-BGF;

809: Upon success of reserving an IMS connection in the above procedure, the P-CSCF forwards the SIP Invite request, which carries the SDP offer and is received in the above step 803, to the terminating UE;

810: The terminating UE feeds back an Offer Response message to the P-CSCF. The fed-back Offer Response message carries the valid media stream address information assigned by the terminating UE to the media stream;

811: Upon reception of the Offer Response message, the P-CSCF sends an Authentication Authorization Request (AAR-Request) message, which carries the valid stream address information obtained by the P-CSCF, to the SPDF;

812~814: The SPDF performs a process of configuring an IMS connection for the C-BGF upon reception of the AAR-Request message, and may optionally further request the C-BGF to perform a NA(P)T binding process;

815: Upon success of the configuration process of an IMS connection, the SPDF sends an Admission-Request message, which carries the valid media stream address information obtained by the SPDF in the above step 811, to the A-RACF;

816: The A-RACF performs a resource admission control for the corresponding media stream according to the media stream information carried in the received Admission-Request message, the media stream information contains the media stream address information;

817: The A-RACF feeds back an Admission-Response message to the SPDF upon success of the resource admission control process for the media stream;

818: The SPDF feeds back an AAR-Answer message to the P-CSCF upon receipt of the Admission-Response message fed back from the A-RACF;

819: Upon receipt of the AAR-Answer message fed back from the SPDF, the P-CSCF feeds back the Offer Response message, which is fed back by the terminating UE and received in the above step 10, to the S-CSCF in the terminating home network;

820: The S-CSCF in the terminating home network forwards the received Offer Response message to the S-CSCF in the originating home network.

Now refer to FIG. 9, which is a schematic diagram of a processing procedure for implementing the resource admission control processing method applied in a FT processing flow as proposed according to a second embodiment of the present invention. The main implementation process thereof will be described as following.

Steps 901~911 in FIG. 9 are identical to steps 801~811 in FIG. 8, thus the descriptions thereof will not be repeated here.

912: The SPDF sends an Admission-Request message, which carries the valid media stream address information obtained by the SPDF in the above step 911, to the A-RACF;

913: The A-RACF performs a resource admission control process for the corresponding media stream according to the received Admission-Request message which carries the media stream address information;

914: The A-RACF feeds back an Admission-Response message to the SPDF upon success of the resource admission control process for the media stream;

915~917: The SPDF performs a process of configuring an IMS connection for the C-BGF upon reception of the Admission-Request message fed back from the A-RACF, and may optionally further request the C-BGF to perform a NA(P)T binding process;

918: The SPDF feeds back an AAR-Answer message to the P-CSCF upon success of the configuration process of an IMS connection;

919: Upon receipt of the AAR-Answer message fed back from the SPDF, the P-CSCF feeds back the Offer Response message, which is received from the terminating UE in the above step 910, to the S-CSCF in the terminating home network;

920: The S-CSCF in the terminating home network forwards the received Offer Response message to the S-CSCF in the originating home network.

Now refer to FIG. 10, which is a schematic diagram of a processing procedure for implementing the resource admission control processing method applied in a FT processing flow as proposed according to a third embodiment of the present invention. The main implementation process thereof will be described as following.

Steps 1001~1009 in FIG. 10 are identical to steps 801~809 in FIG. 8, thus the descriptions thereof will not be repeated here.

1010: The terminating UE feeds back an acknowledgement (200 OK) message, which carries the valid media stream address information assigned by the terminating UE to the media stream, to the P-CFSF in the terminating home network (as apparent to those skilled in the art, there may be other steps between steps 1009 and 1010, the descriptions thereof will not repeated here);

1011: Upon reception of the 200 OK message, the P-CSCF sends an AAR-Request message, which carries the valid media stream address information obtained by the P-CSCF, to the SPDF;

1012: The SPDF sends an Admission-Request message, which carries the valid media stream address information obtained by the SPDF in the above step 1011, to the A-RACF;

1013: The A-RACF performs a resource admission control process for the corresponding media stream according to the media stream information carried in the received Admission-Request message, the media stream information contains the media stream address information;

1014: The A-RACF feeds back an Admission-Response message to the SPDF upon success of the resource admission control process for the media stream;

1015~1017: The SPDF performs both a configuration process of an IMS connection and an Open Gates process for the C-BGF upon receipt of the Admission-Request message fed back from the A-RACF, and may optionally further request the C-BGF to perform a NA(P)T binding process;

1018: The SPDF feeds back an AAR-Answer message to the P-CSCF upon success of both the configuration process of an IMS connection and the Open Gates process;

1019: Upon receipt of the AAR-Answer message fed back from the SPDF, the P-CSCF feeds back the acknowledgement 200 OK message, which is fed back by the terminating UE and received in the above step 1011, to the S-CSCF in the terminating home network;

1020: The S-CSCF in the terminating home network forwards the received acknowledgement 200 OK message to the S-CSCF in the originating home network.

It shall be noted that, the configuration process of an IMS connection and the Open Gates process in the steps 1015~1017 in FIG. 10 may be performed either prior to the step 1012 or while the steps 1012~1014 are executed, and the descriptions thereof will not be repeated here.

A Service-based Policy Decision Function entity according to an embodiment of the present invention may include:

a Configure Connection message receiving unit, adapted to receive a Configure IMS Connection message from a C-BGF;

a current media stream address information obtaining unit, adapted to obtain the current media stream address information which is acquired after a NA(P)T binding process and carried in the Configure IMS Connection message; and an Admission Request message constructing unit, adapted to set the current media stream address information into the Admission Request message.

In addition, a Service-based Policy Decision Function entity according to another embodiment of the present invention may include:

an Authentication Authorization Request message receiving unit, adapted to receive the Authentication Authorization Request message from a P-CSCF;

a current media stream address information obtaining unit, adapted to obtain the media stream address information which is assigned by a terminating party to a media stream and carried in the Authentication Authorization Request message; and an Admission Request message constructing unit, adapted to set the current media stream address information into the Admission Request message.

A Proxy Call Session Control Function entity (P-CSCF) according to an embodiment of the present invention may include:

a current media stream address information determining unit, adapted to determine the media stream address information, which is assigned by a terminating party to a media stream and is carried in a response message fed back by the terminating party, as the current media stream address information; and a resource admission control process triggering unit, adapted to trigger, through an SPDF, an A-RACF to perform a resource admission control process, after the current media stream address information determining unit determines the current media stream address information.

A method for resource admission control process according to another embodiment of the present invention includes: a C-BGF configures an IMS connection according to requirement of an SPDF; the SPDF sends an Admission Request message to an A-RACF, in which the Admission Request message contains current media stream address information; the A-RACF performs a resource admission control process for a corresponding media stream according to the current media stream address information. Wherein the corresponding media stream is the media stream corresponding to the media stream address in the current media stream address information.

A system for resource admission control process according to an embodiment of the present invention includes: an SPDF, adapted to send a request for configuring an IMS connection; a C-BGF, adapted to receive the request for configuring the IMS connection, and configure the IMS connection; an A-RACF, adapted to perform a resource admission control process for a corresponding media stream according to current media stream address information; in which the SPDF sends an Admission Request message to the A-RACF, the Admission Request message contains the current media stream address information. Wherein the corresponding media stream is the media stream corresponding to the media stream address in the current media stream address information.

It shall be noted that, the units in the above described individual function entities are logical entities, and may be combined and integrated in various manners in the specific physical implementations thereof, which descriptions will be not repeated here.

It shall be apparent that those skilled in the art can make various variations and modifications to the embodiments of the present invention disclosed here without departing from the spirit and scope of the present invention. Therefore, it shall be intended that all these variations and modifications be covered by the present invention provided that they fall within the scope of the claims of the present invention and the equivalents thereof.

What is claimed is:

1. A method for a resource admission control process in an originating home network, comprising:

performing, by a Service-based Policy Decision Function entity (SPDF) located in the originating home network, a process of configuring an IP Multimedia Subsystem (IMS) connection for a Core-Border Gateway Function entity (C-BGF) located in the originating home network upon receiving an Authentication Authorization Request (AAR-Request) message;

performing, by the C-BGF, a network address and/or port number translation (NA(P)T) binding process for a media stream;

obtaining, by the SPDF, current media stream address information after the NA(P)T binding process from the C-BGF;

sending, by the SPDF, an Admission Request message containing the current media stream address information obtained from the C-BGF, to an Access-Resource and Admission Control Function entity (A-RACF) located in the originating home network; and performing, by the A-RACF, a resource admission control process for the media stream according to the Admission Request message.

2. The method according to claim 1, wherein the current media stream address information is:

media stream address information, which is acquired after the NA(P)T binding process for the media stream and is from the C-BGF to the SPDF.

3. The method according to claim 2, wherein before the SPDF performs the process of configuring the IMS connection for the C-BGF, the method further comprises:

triggering the SPDF in the originating home network to perform the process of configuring the IMS connection for the C-BGF located in the originating home network by a Proxy Call Session Control Function entity (P-CSCF) in the originating home network when the P-CSCF receives an Offer Response message from a terminating party.

4. The method according to claim 3, wherein the current media stream address information is:
  media stream address information assigned by the terminating party to the media stream.

5. The method according to claim 4,
  wherein the Offer Response message contains the media stream address information assigned by the terminating party to the media stream;
  before sending by the SPDF the Admission Request message to the A-RACF, the method further comprises:
  setting, by the P-CSCF, the media stream address information into an Authentication Authorization Request message, and sending the Authentication Authorization Request message to the SPDF;
  determining, by the SPDF, the media stream address information as the current media stream address information.

6. The method according to claim 1, wherein before the SPDF performs the process of configuring the IMS connection for the C-BGF, the method further comprises:
  triggering the SPDF in the originating home network to perform the process of configuring the IMS connection for the C-BGF located in the originating home network by a Proxy Call Session Control Function entity (P-CSCF) in the originating home network when the P-CSCF receives an Offer Response message from a terminating party.

7. The method according to claim 6, wherein the current media stream address information is:
  media stream address information assigned by the terminating party to the media stream.

8. The method according to claim 7,
  wherein the Offer Response message contains the media stream address information assigned by the terminating party to the media stream;
  before sending by the SPDF the Admission Request message to the A-RACF, the method further comprises:
  setting, by the P-CSCF, the media stream address information into an Authentication Authorization Request message, and sending the Authentication Authorization Request message to the SPDF;
  determining, by the SPDF, the media stream address information as the current media stream address information.

9. A method for a resource admission control process in a terminating home network, comprising:
  receiving, by a Proxy Call Session Control Function entity (P-CSCF) in attic terminating home network, a response message, which carries media stream address information assigned by a terminating party to a media stream, from the terminating party;
  determining, by the P-CSCF in the terminating home network, the media stream address information, which is carried in the received response message, as current media stream address information;
  after determining the current media stream address information, triggering, by the P-CSCF in the terminating home network a Service-based Policy Decision Function entity (SPDF) in the terminating home network to send an Admission Request message containing the current media stream address information, to an Access-Resource and Admission Control Function entity (A-RACF) in the terminating home network; and
  performing, by the A-RACF, a resource admission control process for the media stream according to the received Admission Request message.

10. The method according to claim 9, wherein the response message to the P-CSCF from the terminating party is one of:
  an Offer Response message; or
  an acknowledgement 200 OK message.

11. The method according to claim 10, wherein before, after or while performing the resource admission control process for the media stream by the A-RACF, the method further comprises:
  triggering the SPDF in the terminating home network by the P-CSCF in the terminating home network to perform a process of configuring an IP Multimedia Subsystem (IMS) Connection for a Core Border Gateway Function entity (C-BGF) in the terminating home network.

12. The method according to claim 9, wherein the process of triggering the SPDF to send the Admission Request message carrying the current media stream address information to the A-RACF further comprises:
  setting, by the P-CSCF, the current media stream address information into an Authentication Authorization Request message, and sending the Authentication Authorization Request message to the SPDF in the terminating home network;
  setting, by the SPDF, the current media stream address information into an Admission Request message and sending the Admission Request message to the A-RACF.

13. The method according to claim 12, wherein before, after or while performing the resource admission control process for the media stream by the A-RACF, the method further comprises:
  triggering the SPDF in the terminating home network by the P-CSCF in the terminating home network to perform a process of configuring an IP Multimedia Subsystem (IMS) Connection for a Core Border Gateway Function entity (C-BGF) in the terminating home network.

14. The method according to claim 9, wherein before, after or while performing the resource admission control process for the media stream by the A-RACF, the method further comprises:
  triggering the SPDF in the terminating home network by the P-CSCF in the terminating home network to perform a process of configuring an IP Multimedia Subsystem (IMS) Connection for a Core Border Gateway Function entity (C-BGF) in the terminating home network.

15. The method according to claim 9, wherein before, after or while performing the resource admission control process for the media stream by the A-RACF, the method further comprises:
  triggering the SPDF in the terminating home network by the P-CSCF in the terminating home network to perform a process of configuring an IP Multimedia Subsystem (IMS) Connection for a Core Border Gateway Function entity (C-BGF) in the terminating home network.

16. A Service-based Policy Decision Function entity (SPDF) in a communication network, comprising:
  a message receiving unit, adapted to receive a Configure IP Multimedia Subsystem (IMS) Connection message from a Core Border Gateway Function entity (C-BGF) of the communication network;
  a current media stream address information obtaining unit, adapted to obtain current media stream address information, wherein the current media stream address information is acquired after a network address and/or port number translation NA(P)T binding process and carried in the Configure IMS Connection message;

a message constructing unit, adapted to set the current media stream address information into an Admission Request message, and a message transmitting unit, adapted to transmit the Admission Request message to an Access Resource and Admission Control Function entity (A-RACF) of the communication network.

17. A system for a resource admission control process in an originating home network, comprising:

a Service-based Policy Decision Function entity (SPDF),
a Core-Border Gateway Function entity (C-BGF), and
an Access-Resource and Admission Control Function entity (A-RACF),
wherein:

the C-BGF is adapted to perform a network address and/or port number translation (NA(P)T) binding process for a media stream;

the SPDF is adapted to perform a process of configuring an IP Multimedia Subsystem (IMS) connection for the C-BGF, obtain current media stream address information from the C-BGF after the NA(P)T binding is performed by the C-BGF, and send an admission request message containing the current media stream address information to the A-RACF; and the A-RACF is adapted to perform a resource admission control process for the media stream according to the current media stream address information obtained from the SPDF.

18. The system according to claim 17, wherein the media stream is a media stream corresponding to a media stream address in the current media stream address information.

19. A system for a resource admission control process in a terminating home network, comprising:

a terminating party,
a Proxy Call Session Control Function entity (P-CSCF),
a Service-based Policy Decision Function entity (SPDF), and
an Access-Resource and Admission Control Function entity (A-RACF), wherein:

the terminating party is adapted to send a response message, which carries media stream address information assigned by the terminating party to a media stream, to the P-CSCF;

the P-CSCF is adapted to determine the media stream address information, which is carried in the received response message, as current media stream address information, and trigger the Service-based Policy Decision Function entity (SPDF) to send an Admission Request message containing the current media stream address information to the A-RACF, after determining the current media stream address information; and the A-RACF is adapted to perform a resource admission control process for the current media stream according to the received Admission Request message.

* * * * *

UNITED STATES PATENT AND TRADEMARK OFFICE
CERTIFICATE OF CORRECTION

PATENT NO. : 7,885,262 B2
APPLICATION NO. : 11/515564
DATED : February 8, 2011
INVENTOR(S) : Yuepeng Chen, Lingyuan Fan and Fuqing Huang It is certified that error appears in the above-identified patent and that said Letters Patent is hereby corrected as shown below:

In claim 9, column 17, line 54, please delete "attic" and insert --the-- therefor.

Signed and Sealed this
Second Day of October, 2012

David J. Kappos
*Director of the United States Patent and Trademark Office*